United States Patent
Ehreth

(10) Patent No.: US 6,286,142 B1
(45) Date of Patent: Sep. 4, 2001

(54) METHOD AND SYSTEM FOR COMMUNICATING VIDEO SIGNALS TO A PLURALITY OF TELEVISION SETS

(75) Inventor: David Ehreth, Santa Rosa, CA (US)

(73) Assignee: Alcatel USA, Inc., Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/605,908

(22) Filed: Feb. 23, 1996

(51) Int. Cl.$^7$ ................................................. H04N 7/173
(52) U.S. Cl. ................................................. 725/78; 725/82
(58) Field of Search .......................... 455/3.1, 4.2, 5.1, 455/6.2, 6.3; 348/7, 12, 13, 9; 345/327; 725/78, 82; H04N 7/16, 7/173

(56) References Cited

U.S. PATENT DOCUMENTS

| | | | |
|---|---|---|---|
| 3,889,050 | 6/1975 | Thompson | 178/5.1 |
| 3,990,012 | 11/1976 | Karnes | 325/308 |
| 4,031,543 | 6/1977 | Holz | 358/86 |
| 4,077,006 | 2/1978 | Nicholson | 325/308 |
| 4,673,976 * | 6/1987 | Wreford-Howard | 358/10 |
| 4,885,803 | 12/1989 | Hermann et al. | 455/603 |
| 4,947,244 | 8/1990 | Fenwick et al. | 358/86 |
| 4,994,909 * | 2/1991 | Graves et al. | 358/86 |
| 5,216,499 | 6/1993 | Berkheimer | 358/86 |
| 5,387,927 * | 2/1995 | Look et al. | 348/6 |
| 5,459,506 | 10/1995 | Bushnell | 348/7 |
| 5,481,542 * | 1/1996 | Logston et al. | 370/94.2 |
| 5,481,757 | 1/1996 | Mihara et al. | 455/3.1 |
| 5,483,277 * | 1/1996 | Granger | 348/6 |
| 5,539,449 * | 7/1996 | Blahut et al. | 348/7 |
| 5,652,614 * | 7/1997 | Okabayashi | 348/12 |
| 5,715,020 * | 2/1998 | Kuroiwa et al. | 348/734 |
| 5,781,228 * | 7/1998 | Sposato | 348/13 |
| 5,781,734 * | 7/1998 | Ohno et al. | 348/12 |
| 5,828,403 * | 10/1998 | DeRodeff et al. | 348/10 |

FOREIGN PATENT DOCUMENTS

| | | | |
|---|---|---|---|
| 0094794 | 5/1983 | (EP) | H04N/7/16 |
| 9530305 | 11/1995 | (WO) | H04N/7/173 |

OTHER PUBLICATIONS

Article, Henry J. Kafka and Lorene K. Steffes, "Interactive Video and Multimedia Servers in Public Networks", Interactive Video and Multimedia Servers in Public Networks, Apr. 23, 1995, pp. 271–275.

* cited by examiner

Primary Examiner—Chris Grant
(74) Attorney, Agent, or Firm—Baker Botts L.L.P.

(57) ABSTRACT

A video communications system (10) includes a communications controller (30) that interfaces with a broadband/narrowband network (40) to distribute video signals to a plurality of remote sites (104) in a multi-site location (102). Each remote site (104) includes a channel selector and signaling unit (50) and at least one television set (100). A user enters user input information into a remote selector (70) for processing by the channel selector and signaling unit (50). The channel selector and signaling unit (50) sends the user input information to the communication controller (30) over a video signal distribution network (90) at an upstream frequency selected at a user selectable setting (52). The communication controller (30) responds by modulating the desired video information onto a downstream frequency for transmission to the television set (100) on the video signal distribution network (90). Each remote site (104) has a separate upstream frequency and downstream frequency to allow for independent control of each television set (100).

6 Claims, 1 Drawing Sheet

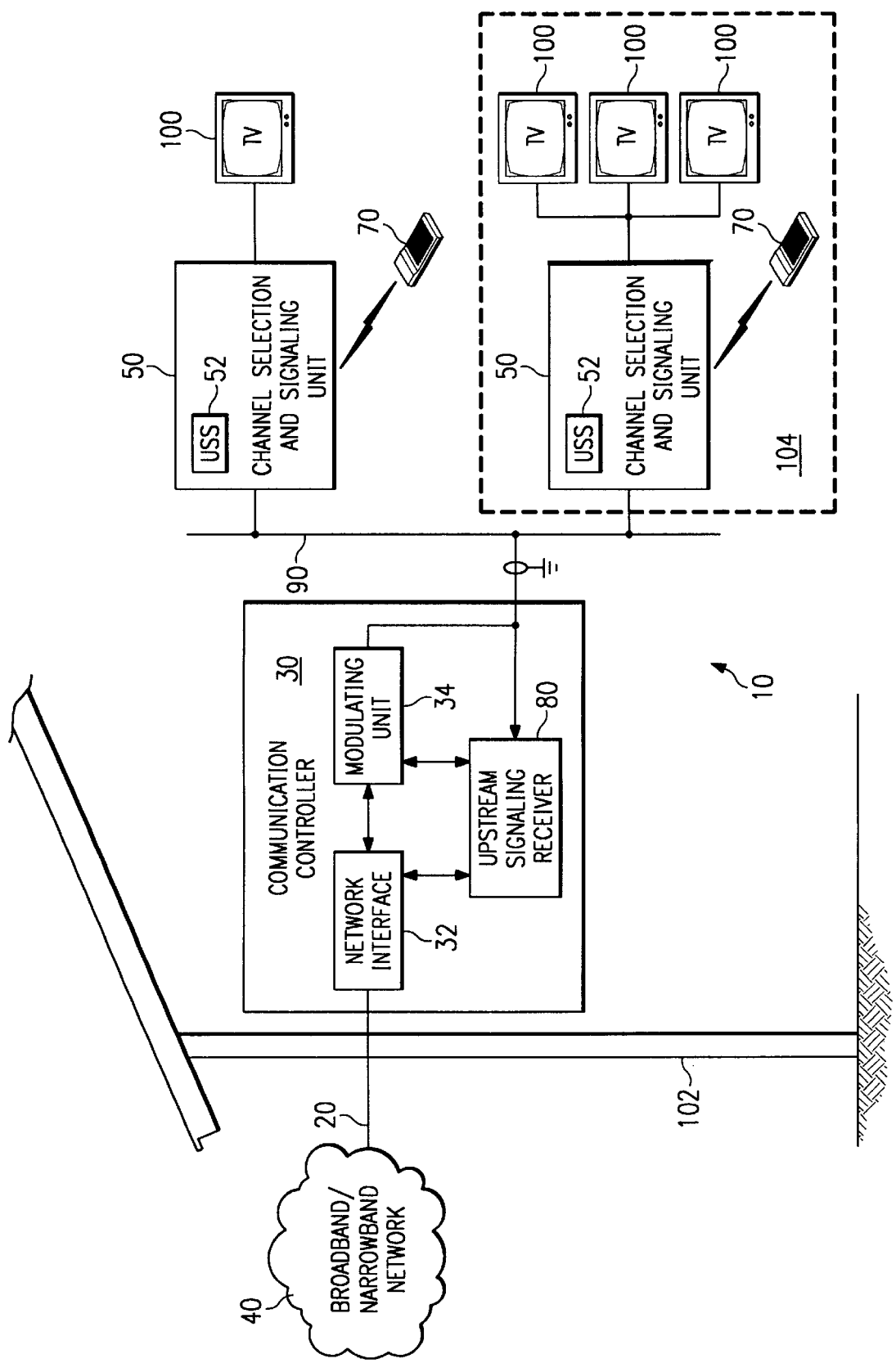

METHOD AND SYSTEM FOR COMMUNICATING VIDEO SIGNALS TO A PLURALITY OF TELEVISION SETS

TECHNICAL FIELD OF THE INVENTION

This invention relates generally to communications systems and more particularly to a method and system for communicating video signals to a plurality of television sets on a single video signal distribution network.

BACKGROUND OF THE INVENTION

Many people have multiple television sets or other information transceivers in their homes. When multiple television sets receive information signals from a single video signal distribution network, a separate set top controller must be connected to each television set in order to allow different information signals to be received by each television set.

One method used to allow multiple television sets to be independently controlled from remote sites involves a subscription cable television system and a number of subscriber drops. Such a method, however, does not allow users to independently control multiple television sets serviced by the same subscriber drop without the use of multiple set top controllers. The television sets in these systems must therefore be "chained" together on the same subscriber drop, each television set having its own set top controller. The use of multiple set top controllers, especially in a home environment, adds undesirable complexity and cost to the cable network. Therefore, it is desirable to have independent control and operation for each of a plurality of television sets on a single video signal distribution network using at most one set top box.

SUMMARY OF THE INVENTION

In accordance with the teachings of the present invention, a method and system for communicating video signals to a plurality of television sets are provided which substantially eliminate or reduce disadvantages and problems associated with prior methods and systems for transmitting selected information to each of a plurality of television sets.

According to an embodiment of the present invention, there is provided a multiple site video distribution system that includes a communication controller that receives video information from a telecommunications network. The communication controller transmits selected video signals from the video information onto a video signal distribution network. A first channel selector and signaling unit sends user input information to the communication controller over the video signal distribution network at a first upstream frequency. The user input information includes a request to receive a first video signal. The communication controller selects the first video signal from the video information in response to the user input information from the first channel selector and signaling unit. The communication controller modulates the first video signal onto a first downstream frequency for transmission to the first channel selector and signaling unit over the video signal distribution network.

A second channel selector and signaling unit sends user input information to the communication controller over the video signal distribution network at a second upstream frequency. The user input information includes a request to receive a second video signal. The communication controller selects the second video signal from the video information in response to the user input information from the second channel selector and signaling unit. The communication controller modulates the second video signal onto a second downstream frequency for transmission to the second channel selector and signaling unit over the video signal distribution network.

The present invention provides various technical advantages over conventional cable television subscription services. For example, one technical advantage is to independently control a plurality of television sets that receive video signals from a single video signal distribution network. Another technical advantage is to eliminate the need to "chain" together multiple set top controllers, thereby reducing cost and complexity for both the user and the network operator. Yet another technical advantage is to reduce the uncertainty relating to the electrical or optical characteristics of the drop termination. Still another technical advantage is to reduce the required complexity of upstream multiple access protocols, which may reduce the cost and complexity that would be associated with set top controllers used in prior systems.

Another important technical advantage of the present invention is the fact that it increases the effectiveness and efficiency of network drop technologies that have distance limitations. Using the present invention, for example, the entire length of a copper drop transceiver with a maximum loop length of five hundred feet would be available for use between the network element (e.g., ONU) and the communications controller. A portion of the five hundred feet would therefore not need to be allocated to connect numerous "chained" set top controllers within a home or other multiple-site structure. Eliminating such "chaining" configurations may make, for example, up to two hundred feet of transmission distance available, resulting in substantial cost savings to the network.

A further technical advantage is to avoid placing all the video signals onto the single video signal distribution network for selective pick off by the tuner of the television set through the set top controller as is done in conventional cable television systems. Only those video signals currently desired are placed on the single video signal distribution network by selective modulation onto separate frequency carriers for each of the television sets on the network. Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIG. 1 is a schematic representation of a video communications system servicing multiple television sets on a single video signal distribution network.

DETAILED DESCRIPTION OF THE INVENTION

FIG. 1 is a schematic representation of a video communications system 10. Video communications system 10 includes a communications controller 30 placed in a convenient location associated with a multi-site location 102, such as a home or business, having a plurality of television sets 100. Communications controller 30 provides data and video signals to the plurality of television sets 100 within multi-site location 102. Multi-site location 102 includes a plurality of remote sites 104, each having a channel selector and signalling unit 50 and at least one corresponding television set 100. Though shown as a separate unit, channel selector and signaling unit 50 may be incorporated within or integrated into television set 100. Remote sites 104 may represent different units in a multiple-site structure, for example, an apartment complex, hotel, or other large building. Remote sites 104 may also represent separate parts of a residential dwelling, office, or other structure. For illustration purposes, remote sites 104 are discussed herein as located within a typical residential dwelling.

Communications controller 30 is coupled to a broadband/narrowband network 40 through a drop cable 20. Broadband/narrowband network 40 provides the data and video signals for distribution to television sets 100 through communications controller 30. Broadband/narrowband network 40 may provide all data and video signals subscribed to by multi-site location 102 or only those signals requested by communication controller 30. Drop cable 20 is operable to transmit data and video signals from broadband/narrowband network 40 to communications controller 30. Drop cable 20 may be a twisted conductor pair, conventional coaxial cable, fiber optic transmission line, or other suitable signal transmission medium. Communications controller 30 includes a network interface 32 that communicates with broadband/narrowband network 40 for termination of video information coming in from broadband/narrowband network 40 over drop cable 20. Network interface 30 is also operable to conduct ATM cell management and generation activities, including multiple ATM sessions. Network interface 32 may further convert ATM cells carrying Motion Picture Experts Group (MPEG) encoded video to an analog format. Though shown to be located within multi-site location 102, communications controller 30 may be incorporated within or integrated into broadband/narrowband network 40.

Communications controller 30 includes an upstream signaling receiver 80. In connection with upstream signaling receiver 80, communications controller 30 is operable to receive and manage upstream information signals from channel selector and signaling unit 50 at each remote site 104. Communications controller 30 also includes a modulating unit 34 that is operable to select and modulate video information from network interface 30 into downstream information signals for transmission onto any one of a plurality of downstream RF channels for appropriate distribution to television sets 100 through respective channel selector and signaling units 50. Downstream information signals include data and video signals, and may be in analog form, digital form, a combination of analog and digital, or may have other signal forms suitable for data and video information transmission.

Television sets 100, through corresponding channel selector and signaling units 50, are coupled to a video signal distribution network 90 of the type currently used for subscription cable television. Video signal distribution network 90 is operable to transmit information signals to, from, and between upstream signaling receiver 80, channel selector and signalling unit 50, and television sets 100. The present invention also contemplates other transmission media operable to combine with or replace the functions of video signal distribution network 90. Although television sets are discussed herein, the present invention contemplates other transceivers, including computer monitors, operable to receive incoming information signals and communicate the received information to a user or users.

In one embodiment, the user enters user input information into channel selector and signaling unit 50 through a remote selector 70. User input information are transmitted on video signal distribution network 90 as upstream information signals and may include a video channel selection, viewer response or opinion data, program rating information, or other information to be communicated upstream from a user or users at a remote site 104. Remote selector 70 may be similar to devices currently used to remotely control televisions or other electronic devices using infrared radiation. Although remote selector 70 is discussed herein as transmitting information entered by the user using infrared radiation, the present invention contemplates other suitable signal transmission media for entering user input information.

Channel selector and signaling unit 50 is coupled to video signal distribution network 90 such that channel selector and signalling unit 50 is operable to receive signals from and transmit signals to other components of the system over video signal distribution network 90. Channel selector and signalling unit 50 is operable to receive user input information entered by a user from remote selector 70, and to transmit the user input information as upstream information signals to upstream signaling receiver 80 associated with communications controller 30 over video signal distribution network 90.

Channel selector and signalling unit 50 includes a user selectable setting 52. The user selects an upstream frequency setting at user selectable setting 52, which corresponds to a pre-determined upstream frequency at which channel selector and signalling unit 50 is to transmit upstream information signals to upstream signaling receiver 80 over video signal distribution network 90. The upstream frequency setting at user selectable setting 52 is different from the upstream frequency setting at any other user selectable setting 52 of other channel selection and signaling units 50 on video signal distribution network 90. The selected upstream frequency setting is communicated to upstream signaling receiver 80 over video signal distribution network 90. The upstream information signals transmitted by channel selector and signalling unit 50 to upstream signaling receiver 80 communicate the user input information entered by the user from remote selector 70. For illustration purposes, user input information is discussed as including the selection of a channel from which the user wishes to receive video information.

Channel selector and signalling unit 50 transmits upstream information signals containing the desired channel selection to upstream signaling receiver 80 at the upstream frequency determined by user selectable setting 52. Upstream signaling receiver 80 may be located within communications controller 30 or at any other suitable location that allows communications controller 30 to function in coordination with upstream signaling receiver 80. Upstream signaling receiver 80 is operable to receive upstream information signals from channel selector and signalling unit 50 over video signal distribution network 90 and, in response thereto, to transmit downstream information signals containing the selected video information to the appropriate television set 100 through the selecting channel selector and signaling unit 50 over video signal distribution network 90. Upstream signaling receiver 80 transmits downstream information signals at a downstream frequency that is pre-determined according to and associated with the selected upstream frequency.

In response to receiving upstream information signals from the plurality of channel selector and signalling units 50 within video communications system 10 over different upstream frequencies, upstream signaling receiver 80 is operable to transmit downstream information signals to television sets 100 associated with the plurality of remote sites 104. Each channel selector and signaling unit 50 is set to its own downstream frequency according to its corresponding upstream frequency selected at user selectable setting 52. Since the downstream frequency of each channel selector and signaling unit 50 is different and determined according to the corresponding upstream frequency, communications controller 30 may transmit video information to one or more television sets 100 at each remote site 104 independently of the other television sets 100 at other remote sites 104. Upstream signaling receiver 80 modulates downstream information signals onto appropriate downstream frequencies for transmission to appropriate channel selector and signaling units 50.

By way of example, a user at remote site 104 may be instructed that if the upstream frequency setting on user selectable setting 52 is selected to "5", the user will receive all video information on channel 5 corresponding to the downstream frequency and associated with the upstream frequency setting. The user need only select the video information desired using remote selector 70 and have television set 100 tuned to channel 5 for appropriate viewing. Further, a second user having an upstream frequency setting of "6" may receive video information on corresponding television set 100 tuned to channel 6 according to its corresponding downstream frequency. Each remote site 104 has an upstream frequency on which to transfer user input information and a separate downstream frequency on which to receive video signals.

In summary, a video communications system has an upstream frequency for transmitting user input information from a channel selector and signalling unit 5 to an upstream signaling receiver over a video signal distribution network. In response to the upstream frequency, an upstream signaling receiver selects an appropriate downstream frequency upon which is modulated downstream information signals that include desired video information. Because of the broad range of frequencies available, numerous television sets at remote sites may be accommodated by a single communications controller. One or more television sets at each remote site are therefore independently controlled using a single drop cable.

Thus, it is apparent that there has been provided, in accordance with the present invention, a method and system for independently communicating video information to a plurality of television sets that satisfy the advantages set forth above. Although the present invention hase been described in detail, it should be understood that various changes, substitutions, alterations, and modifications can be made herein without departing from the spirit and scope of the invention as defined by the appended claims.

What is claimed is:

1. A multiple site video distribution system for a single subscriber location, comprising:

a set top communications controller operable to receive video information from a telecommunications network over a drop cable, the set top communications controller operable to transmit selected video signals from the video information received over the drop cable on a single feeder line;

a first channel selector and signaling unit associated with a first television set and operable to send user input information over a first upstream frequency of the single feeder line to the set top communications controller, the user information including a request to receive a first video signal, the set top communications controller operable to select the first video signal from the video information and modulate the first video signal onto a first downstream frequency of the single feeder line, the set top communications controller operable to send the first video signal to the first channel selector and signaling unit and the first television set over the single feeder line at the first downstream frequency;

a second channel selector and signaling unit associated with a second television set and operable to send user input information over a second upstream frequency of the single feeder line to the set top communications controller, the user information including a request to receive a second video signal, the set top communications controller operable to select the second video signal from the video information and modulate the second video signal onto a second downstream frequency of the single feeder line, the set top communications controller operable to send the second video signal to the second channel selector and signaling unit and the second television set over the single feeder line at the second downstream frequency.

2. The video distribution system of claim 1, wherein the first and second channel selector and signaling units have a user selectable setting to adjust a value of the first and second upstream frequencies respectively.

3. The video distribution system of claim 1, wherein user input information is received by the first and second channel selector and signaling units by infrared remote transmission means.

4. The video distribution system of claim 1, wherein the set top communication controller determines a value of the first and second downstream frequencies according to a value of the first and second upstream frequencies respectively.

5. The video distribution system of claim 1, wherein the set top communication controller sends a request to receive the first video signal to the telecommunications network in response to the first video signal not being present in the video information.

6. The video distribution system of claim 1, wherein the single feeder line is a coaxial cable connection.

* * * * *